United States Patent
Shu

(10) Patent No.: US 9,513,784 B2
(45) Date of Patent: Dec. 6, 2016

(54) METHOD AND DEVICE OF CONTROLLING INPUT FOR INPUT BOXES

(71) Applicant: Tencent Technology (Shenzhen) Company Limited, Shenzhen (CN)

(72) Inventor: Yuqiang Shu, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 448 days.

(21) Appl. No.: 14/226,754

(22) Filed: Mar. 26, 2014

(65) Prior Publication Data

US 2014/0380228 A1   Dec. 25, 2014

Related U.S. Application Data

(63) Continuation of application No. PCT/CN2014/070098, filed on Jan. 3, 2014.

(30) Foreign Application Priority Data

Jun. 20, 2013   (CN) .......................... 2013 1 0247260

(51) Int. Cl.
| | |
|---|---|
| *G06F 3/00* | (2006.01) |
| *G06F 3/0484* | (2013.01) |
| *G06F 17/30* | (2006.01) |
| *G06F 3/0488* | (2013.01) |
| *G06F 3/01* | (2006.01) |

(52) U.S. Cl.
CPC ......... *G06F 3/0484* (2013.01); *G06F 3/04886* (2013.01); *G06F 17/30876* (2013.01)

(58) Field of Classification Search
None
See application file for complete search history.

(56) References Cited

U.S. PATENT DOCUMENTS

| | | | |
|---|---|---|---|
| 2009/0132950 A1 | 5/2009 | Gibson et al. | |
| 2010/0241985 A1* | 9/2010 | Kim .................... | G06F 3/04886 715/773 |
| 2014/0108990 A1* | 4/2014 | Zhai ..................... | G06F 3/0237 715/773 |

FOREIGN PATENT DOCUMENTS

CN        101916158 A     12/2010

OTHER PUBLICATIONS

Tencent Technology, ISRWO, PCT/CN2014/070098, Apr. 22, 2014, 7 pgs.
Tencent Technology, IPRP, PCT/CN2014/070098, Dec. 22, 2015, 5 pgs.

* cited by examiner

*Primary Examiner* — Toan Vu
(74) *Attorney, Agent, or Firm* — Morgan, Lewis & Bockius LLP

(57) ABSTRACT

A method and device for controlling information input for text boxes are disclosed. The method includes: at a device having one or more processors, memory, and a display: detecting selection of a text input box in a user interface; in response to detecting the selection of the text input box and prior to receiving input text for the text input box, obtaining a regular expression for acceptable input corresponding to text input box; for each character in the regular expression, determining whether the character belongs to a respective validation filter character set for a predetermined data type; and in response to a determination that all characters in the regular expression belongs to the respective validation filter character set for the predetermined data type, selectively presenting a respective character keyboard corresponding to the predetermined data type to a user for text entry.

9 Claims, 9 Drawing Sheets

METHOD AND DEVICE OF CONTROLLING INPUT FOR INPUT BOXES

RELATED APPLICATIONS

This application is a continuation application of PCT Patent Application No. PCT/CN2014/070098, entitled "METHOD AND DEVICE OF CONTROLLING INPUT FOR INPUT BOXES" filed Jan. 3, 2014, which claims priority to Chinese Patent Application Serial No. 201310247260.4, entitled "Method and Device of Controlling Information Input for Input Boxes", filed Jun. 20, 2013, the entirety of both of which are incorporated herein by reference.

FIELD OF THE INVENTION

The present disclosure relates to the information input field, especially relates to a method and device for controlling information input for input boxes.

BACKGROUND OF THE INVENTION

In a web page, input boxes are often provided for users to input words or textual information, email addresses, telephone numbers, or the hyperlink information of files, and so on. During the design of these input boxes, web developers often prescribe the data types acceptable for each input box, for example, numeric type, Chinese character type, Roman letter type, and so on. After the user has provided the data input into the input box and submitted the data input, e.g., by pressing "enter" or moving onto the next input box, the inputted data is verified against the data type(s) prescribed for the input box to determine whether the input data meets the requirements of the input box. Frequently, the requirement of the input box is provided in the form of a regular expression corresponding to the input box.

SUMMARY

As described in the background section, different input boxes may require input of different character types (e.g., numbers, symbols, Roman characters, Chinese characters, Greek characters, etc.). Some input boxes may require a single character type or a mixed character types following respective formatting requirements. For example, an input box for receiving a telephone number may require all input characters to be numbers, and requires that the total number of numbers in the input box be exactly 10. For another example, an input box for receiving a first name may require all input characters to be Roman or Chinese characters, and for input containing Roman characters, no space character is permitted in the input. Other character type and format requirements for different information types are possible. One problem with inputting information in the input box is that, the user often has to switch between keyboards (e.g., the number keyboard, English character keyboard, symbols keyboard, and Chinese Pinyin keyboard) in order to complete input to an input box. This is very cumbersome and inefficient.

As described in the present disclosure, a method and device for controlling information input for input boxes makes the determination of the required data type for a currently selected input box, and based on the required character type, proactively and selectively presenting a suitable keyboard to the user according to the current input needs of the user. Since a regular expression for post-entry validation of user input is frequently provide with the input boxes on web pages, the present method and device takes advantage of this available regular expression to determine the required data type and hence the suitable keyboard for presentation to the user before the user starts the character entry into the input box. In some embodiments, only if all characters required in an input box can be found in a given keyboard, will the keyboard be automatically presented in lieu of a current or default keyboard. In some embodiments, the keyboard corresponding to the initial character input is provided first.

In some embodiments, a method of input control for text input boxes, comprising: at a device having one or more processors, memory, and a display: detecting selection of a text input box in a user interface; in response to detecting the selection of the text input box and prior to receiving input text for the text input box, obtaining a regular expression for acceptable input corresponding to text input box; for each character in the regular expression, determining whether the character belongs to a respective validation filter character set for a predetermined data type; and in response to a determination that all characters in the regular expression belongs to the respective validation filter character set for the predetermined data type, selectively presenting a respective character keyboard corresponding to the predetermined data type to a user for text entry. In this way, when a user needs to input information in the input box, the user may need to continuously switch keyboard due to the data type of different input boxes, which will reduce the efficiency of information input.

In another aspect, a device comprises one or more processors, memory, and one or more program modules stored in the memory and configured for execution by the one or more processors. The one or more program modules include instructions for performing the method described above. In another aspect, a non-transitory computer readable storage medium having stored thereon instructions, which, when executed by a device, cause the device to perform the method described above.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

The following describes further technical scheme of the present invention in combination of attached drawings of specification as well as specific embodiments. It should be understood that the specific embodiments described herein is merely used to illustrate the present invention, rather than to limit the present invention.

In some embodiments, when an input box in a user interface (e.g., a fill-able form on a web page) has been selected and awaits information input (e.g., text input through keyboard entry) from a user, the user device automatically presents the soft keyboard (e.g., a soft English character keyboard, number keyboard, Pinyin keyboard, or symbols keyboard, etc. on a touch-sensitive display screen), according to the type of input data required by the input box. Therefore, manual switching soft keyboards repeatedly during the information input by the user can be reduced or avoided, which improves the efficiency of information input on the user device.

The description of the following embodiments uses the information input control of an input box on webpage presented in a browser as an example. However, this is not meant to limit the scope of application and protection of the methods described herein. The method of automatically, proactively selecting and presenting a suitable soft keyboard on a touch-sensitive display screen based on the required data type of a currently selected text input box can be applied to input boxes that appear in other types of interfaces, e.g., various applications, information collection devices, automated teller machines, etc. The utilization of the regular expression for post-entry data validation may be replaced by the utilization of other types of format requirement information associated with the input boxes which may be available to the user device displaying the input box.

Figure 1:
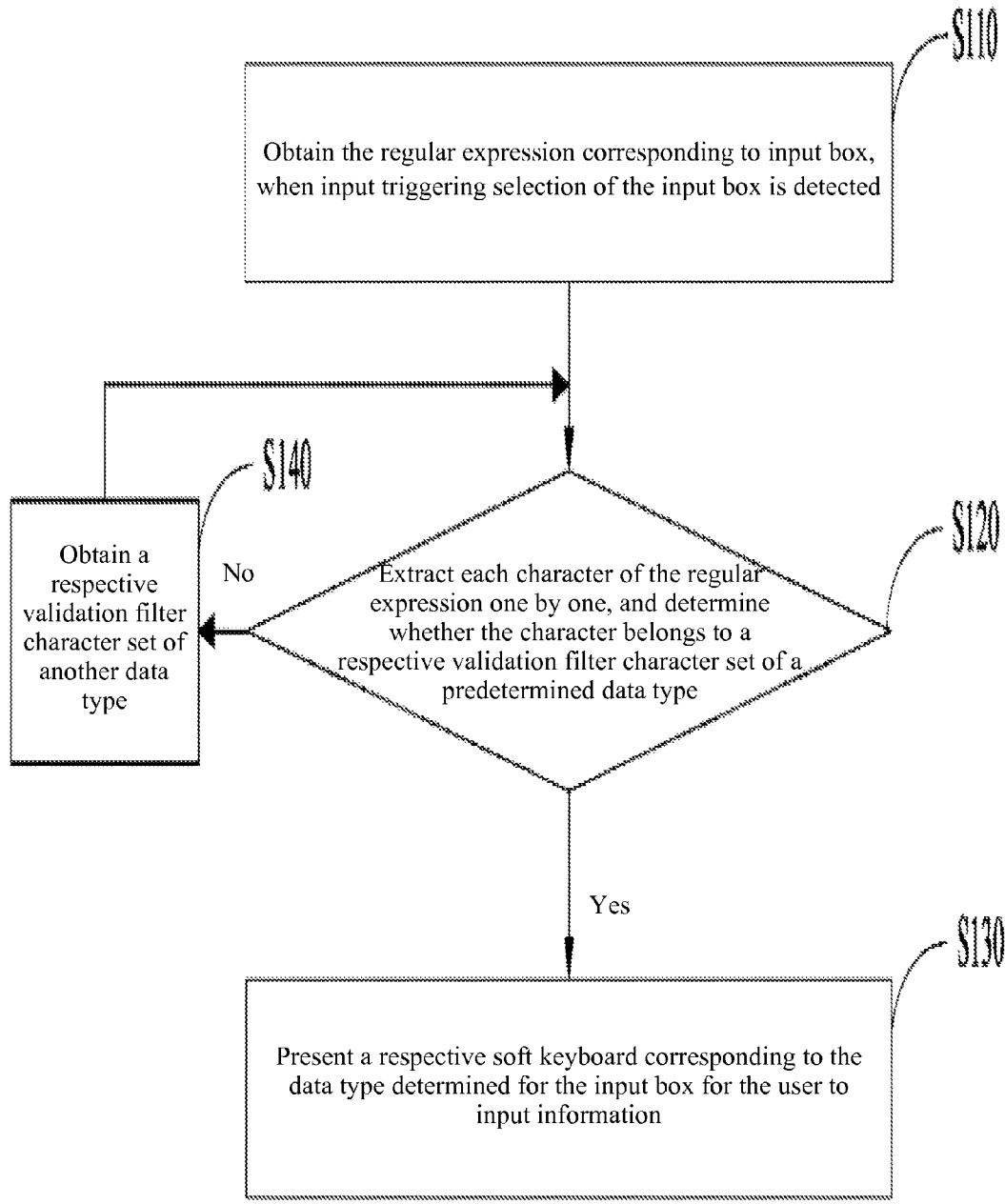
FIG. 1 is the schematic flowchart diagram of an information input control method for input boxes in accordance with some embodiments.

FIG. 1 illustrates a method of controlling information input for input boxes in accordance with some embodiments. The method is performed on a user device having one or more processors, memory, and a touch-sensitive display screen for presenting one or more input boxes and selectively presenting one of multiple available soft keyboards in response to user selection or the keyboard selection method described herein. The information input control method for input boxes includes:

Step S110, the device obtains the regular expression corresponding to input box, when input triggering selection of the input box is detected;

Specifically, the device detects selection of a text input box in a user interface; and in response to detecting the selection of the text input box and prior to receiving input text for the text input box, the device obtains a regular expression for acceptable input corresponding to text input box.

Taking a webpage displayed in a browser of a user device as an example, the page information for the webpage in the browser being expressed in the form of HTML15 code. If there is an input box in the web page, the attribute of the input box is set in the HTML15 code. For example, a "max" attribute is used to specify the maximum value of the input field, the "min" attribute is used to specify the minimum value of the input field, the "name" attribute is used to specify the name of input element, and the "pattern" attribute is used to specify the pattern or the format of the value of the input field. Specifically, the content of the "pattern" attribute is in the form of a regular expression. For example, the regular expression in for an input box may be "[0-9]", which means that the input value for the input box must be an integer between 0-9. The detection of the input triggering selection of the input box can include: the device detects whether there is any input box in the webpage browsed by the user; if there is an input box, the device obtains movement of the cursor (or the contact point of a touch input on a touch-sensitive display screen) on the interface; if the cursor (or contact point) switches input focus onto the input box, the focus is locked onto the input box (i.e., the input box is selected), and the device generates an input triggering command; then, according to this input triggering command, the device obtains the regular expression in the "pattern" attribute corresponding to the selected input box.

Step S120, the device extracts each character of the regular expression one by one, and determines, for each character in the regular expression, whether the character belongs to a respective validation filter character set of a predetermined data type;

In response to a determination that all characters in the regular expression belong to the respective validation filter character set of the predetermined data type, the device proceeds to Step S130; and in response to a determination that any one character in the regular expression does not belong to the validation filter character set of the predetermined data type, the device proceeds to Step S140;

In some embodiments, the predetermined data type is one of three kinds of data types, namely, Roman letters, Chinese characters, and numbers. The regular expression for each kind of data type is different, and the regular expression corresponding to same data type can be different as well due to special requirements expressed in the regular expression. In some embodiments, the regular patterns of various regular expressions corresponding to a given data type can be observed, and the validation filter character set of the given data type can be established accordingly. Taking the case of the validation filter character set for the number type as an example, in some embodiments, the device matches each character in the obtained regular expression corresponding to the selected input box with the validation filter character set of the number type, so as to determine the input data type required by the selected input box.

Step S130, the device presents a respective soft keyboard corresponding to the data type determined for the input box for the user to input information;

Specifically, in some embodiments, in response to a determination that all characters in the regular expression belongs to the respective validation filter character set for the predetermined data type, the device presents a respective character keyboard corresponding to the predetermined data type to a user for text entry.

For example, if each character in the obtained regular expression of the input box belongs to the validation filter character set of the number type, it means that the data type required by the input box is the number type, and consequently, the device presents the numeric soft keyboard to the user.

Step S140, the device obtains a respective validation filter character set of another data type, and returns to Step S120, so as to determine whether the data type required by the selected input box is this other data type. In some embodiments, a respective validation filter character set is established for each soft keyboard. In some embodiments, a respective soft keyboard can be pre-established for each predetermined data type, and which includes all possible keys that may be used for the data type. In such embodiments, the respective soft keyboard for the determined data type of the input box can be presented once the data type of the input box has been determined. In some embodiments, the data type of the input box may be defined according to specific needs, and may not be limited to the number keyboard, the Roman letter keyboard, and the Pinyin keyboard. Data types each defined by a respective validation filter character set including some or all of multiple conventional keyboards are possible in various embodiments.

In some embodiments, if any one character in the regular expression does not belong to the validation filter character set of the predetermined data type, the device ends the process. In some embodiments, the device can also return to Step S120 again, and perform the process for a next predetermined data type: e.g., extracting each character of the regular expression one by one, and determining whether the character belongs to the validation filter character set of the next data type. For example, when the device determines that a character in the regular expression does not belong to the validation filter character set of the number type, the device determines again whether each character of the regular expression belongs to the preset filtering character validation set of the Chinese character type. The process can continue for other predetermined data types, until the data type of the input box has been identified.

In some embodiments, when an input box is selected for information input, the device, according to the regular expression corresponding to the input box, determines the data type required by the input box, so as to present the corresponding soft keyboard of the determined data type for user to input information in the input box. As a result, the user does not need to frequently manually switch the soft keyboards for inputting information in the input box, which improves the efficiency of information input on the device.

Figure 2:
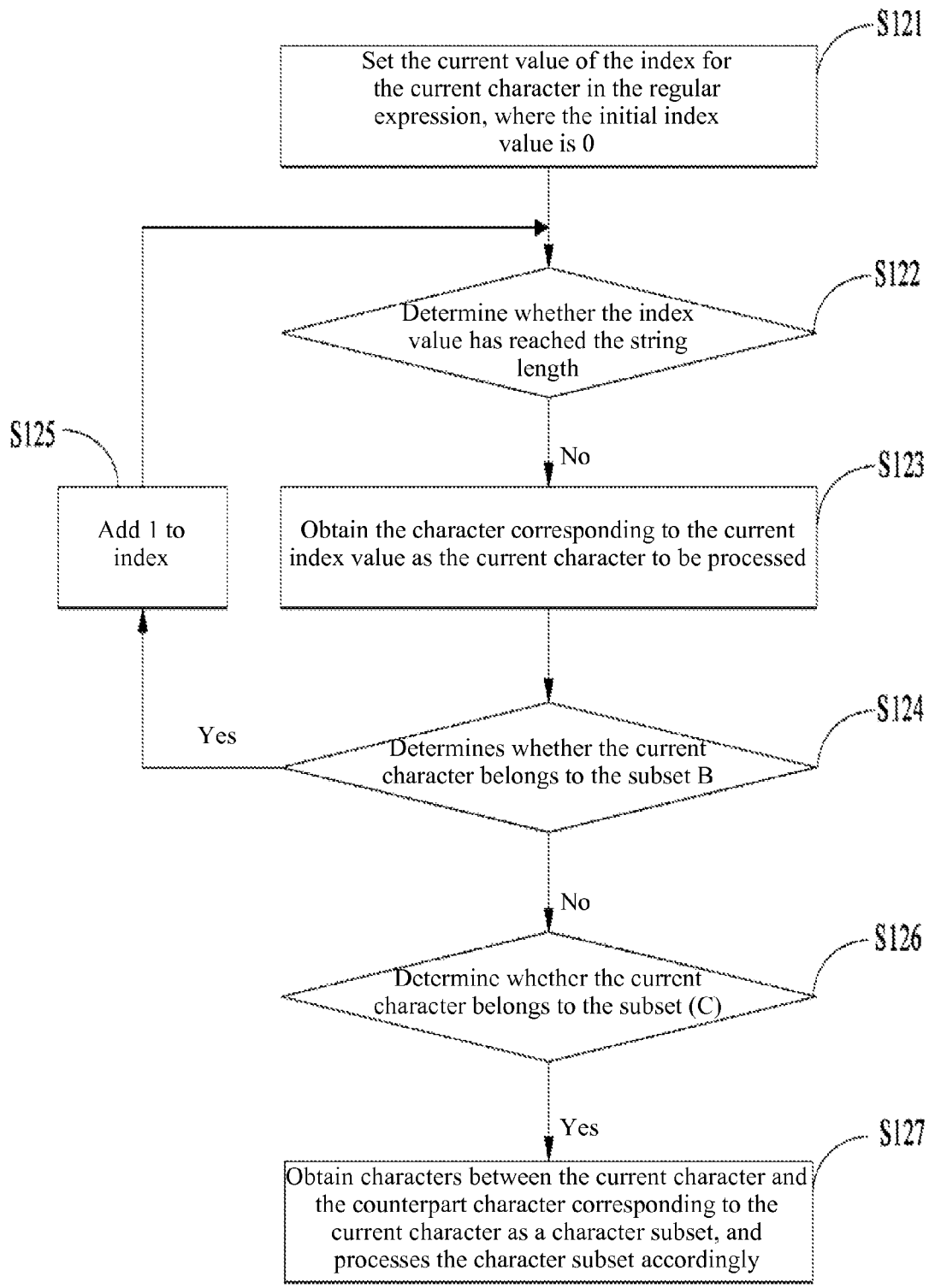
FIG. 2 is the schematic flowchart diagram an information input control method for input boxes in accordance with some embodiments.

In some embodiments, as shown in FIG. 2, a method of controlling information input for input boxes further include the following steps. Specifically, the validation filter character set includes regular validation filter characters (e.g., in a subset B) and special validation filter characters (e.g., in a subset C). For example, in some embodiments, the subset (B) of regular validation filter characters includes {*, +, $, |, \b, \d, \B, \num}, and the subset (C) of special validation filter characters includes {^, [ ], { }, ( ), \nm} In some embodiments, the aforementioned Step S120 includes:

Step S121, the device sets the current value of the index for the current character in the regular expression, where the initial index value is 0;

First, the index value is set to zero, in other words, the processing starts from the first character of the regular expression. After the determination for a current character is completed, the index value is updated by adding 1 to the current index value.

Step S122, the device determines whether the index value has reached the string length (e.g., "strlen") of the regular expression; if no, proceed to Step S123; otherwise, end the process;

When the current index value equals to the string length of the regular expression, it means that the determination for all characters in the regular expression have been completed.

Step S123, the device obtains the character corresponding to the current index value as the current character to be processed;

In some embodiments, through c=str[index], the device can extract each character of the regular expression one by one, as the current character to be processed.

Step S124, the device determines whether the current character belongs to the subset B of regular validation filter characters; if yes, the device proceeds to Step S125, otherwise, the device proceeds to Step S126;

Step S125, the device adds 1 to the current index value, and returns to S122;

In some embodiments, when the current character c belongs to the subset (B) of regular validation filter characters, the device adds 1 to the current index value, and then returns to Step S122. For example, in some embodiments, the device obtains the next character by c=str[index] of the regular expression, and uses the obtained character as the current character.

Step S126, the device determines whether the current character belongs to the subset (C) of special validation filter characters; if so, the device proceeds to Step S127, otherwise, the device ends the process;

Step S127, the device obtains the characters between the current character (e.g., "(", or "{") and the counterpart character (e.g., ")" or "}") corresponding to the current character as a character subset, and processes the character subset accordingly.

Specifically, n some embodiments, when the current character belongs to the subset (C) of special validation filter characters, the device obtains all characters that fall between the current character and its matching counterpart character, and treats these characters that fall between the two matching special validation filter characters as a character subset, and then conducts corresponding special processing for the character subset depending on what the two special filter characters are. For example, in some embodiments, for the character subset between a pair of special validation filter characters "{" and "}", the device directly passes the characters in the character subset without further processing thereof; for the character subset that fall between a pair of special validation filter characters "(" and ")" or a pair of special validation filter characters "[" and "]", the device makes individual determination for each character within this character subset, and determines whether all of them belong to the validation filter character set of the predetermined data type.

Specifically, in some embodiments, for each character in the regular expression, the process for determining whether the character belongs to the respective validation filter character set for the predetermined data type further includes: determining whether the character belongs to the subset of regular validation filter characters or the subset of special validation filter characters; in accordance with a determination that the character belongs to the subset of regular validation filter characters, proceeding to process a next character in the regular expression; and in accordance with a determination that the character belongs to the subset of special validation filter characters, processing all characters that fall between the character and a counterpart character of the character in the regular expression as a respective character subset.

Figure 3:
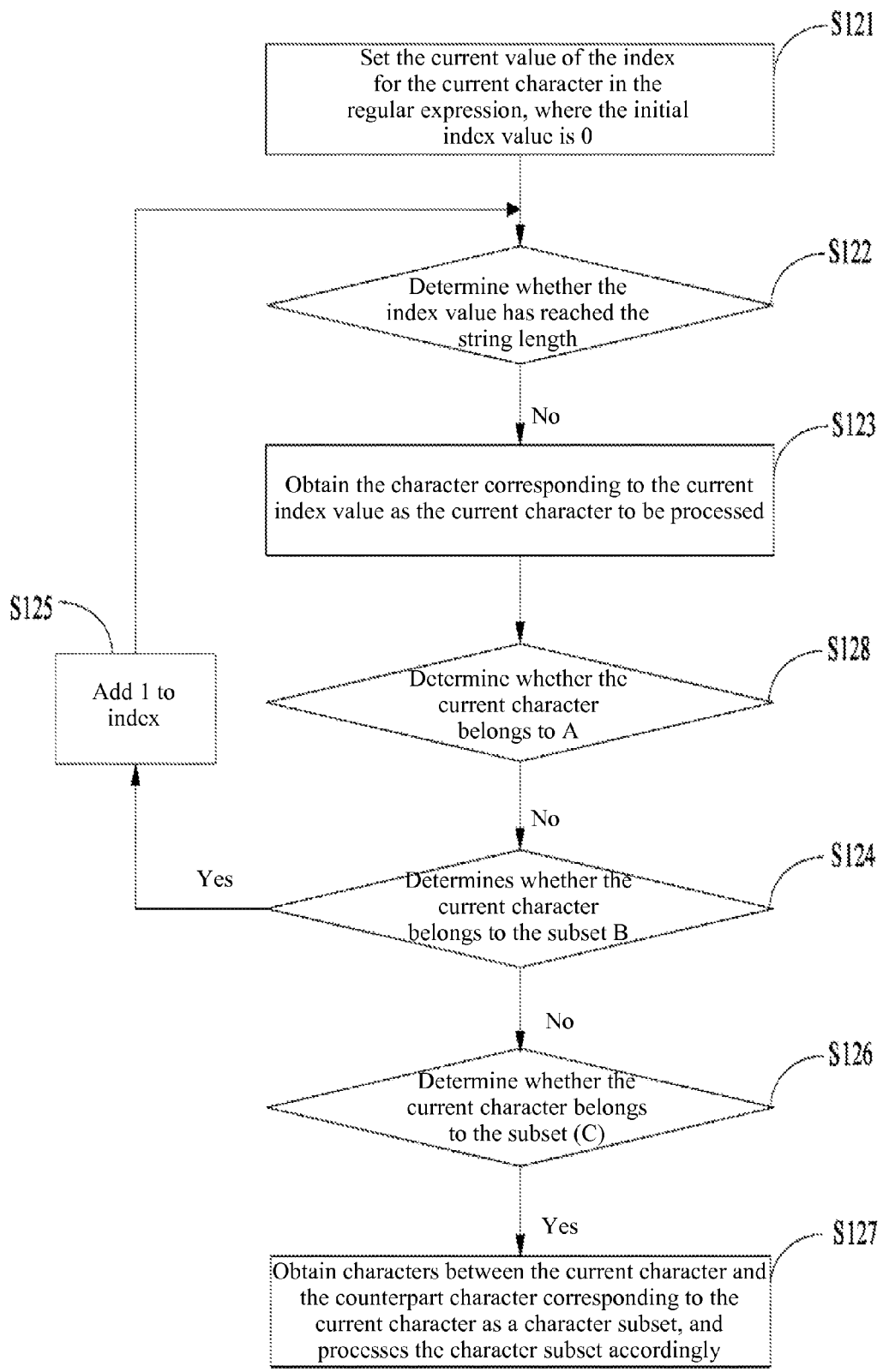
FIG. 3 is the schematic flowchart diagram an information input control method for input boxes in accordance with some embodiments.

In some embodiments, as shown in FIG. 3, the method for controlling information input for input boxes further include the following sub-steps. In some embodiments, after the aforementioned Step S123, the information input control method also includes:

Step S128, the device determines whether the current character belongs to a subset (A) of stop characters for the predetermined data type; if yes, the device ends the process, otherwise, the device proceeds to Step S124;

In some embodiments, in order to reduce the number of determinations made for a given data type, a set of stop characters can be pre-established for the given data type. Taking the number type as an example, its stop character set (e.g., a subset A) includes {../, \D, \w, \W, \cx, \f, \n, \r, \s, \t, \v, letters, Chinese characters, \xn}. The meaning of these characters (including the ones with a "\" on the left are well known to a person of ordinary skills in the art, and is not repeated here for brevity. Before determining whether the current character belongs to the validation filter character set of the predetermined data type, the device determines whether the current character belongs to the set of stop characters for the data type; if the current character belongs to the set of stop characters, the device can directly determine that the data type of this input box is not the predetermined data type (e.g., the number type). Therefore, through pre-establishing the respective stop character set for each predetermined data type, and conducting the above preliminary determination for the current character, the subsequent determination process can be eliminated if the preliminary determination determines that the predetermined data type is not the data type of the input box.

Specifically, in some embodiments, for each character in the regular expression: when determining whether the character belongs to the subset of regular validation filter characters or the subset of special validation filter characters, the device first determines whether the character belongs to a stop character set for the predetermined data type; and in accordance with a determination that the character does not belong to the stop character set for the predetermined data type, the device proceeds to determine whether the character belongs to the subset of regular validation filter characters or the subset of special validation filter characters; otherwise, the device moves on to process the regular expression for a next predetermined data type.

Figure 4:
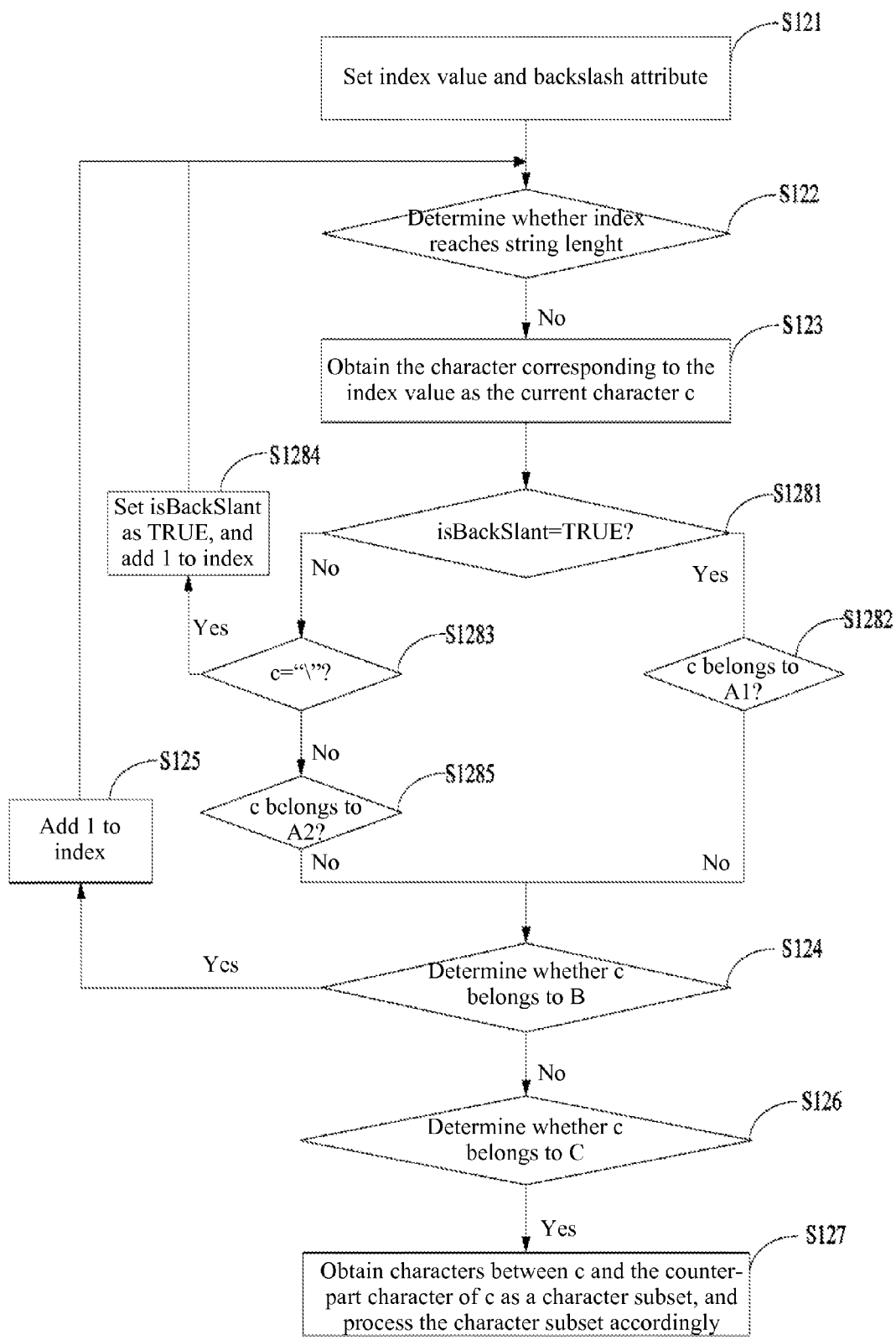
FIG. 4 is the schematic flowchart diagram of an information input control method for input boxes in accordance with some embodiments.

In some embodiments, as shown in FIG. 4, the information input control method for input boxes further include the following sub-steps. In some embodiments, some stop characters in the set of stop characters for the predetermined data type includes characters each having a respective backslash character. Thus, in order to ease the processing for the characters, the set (A) of stop characters are divided into a subset (A1) of stop characters each having a backslash, and a subset (A2) of stop character without a backslash. In some embodiments, the mentioned set of stop characters (A) includes a subset of stop characters A1 having a backslash condition, and a subset of stop characters A2 without a backslash condition. As such, in some embodiments, the aforementioned Step S128 includes:

Step S1281, the device determines whether the backslash attribute of the current character is "true"; if yes, then the device proceeds to Step S1282, otherwise, the device proceeds to Step S1283;

In some embodiments, the device also sets a backslash attribute "is BackSlant" as "TRUE" to indicate the presence of the backslash in the current character in Step S121. The backslash attribute "is BackSlant" is "FALSE" by default indicating that no backslash is present in the current character.

Step S1282, the device determines whether the current character c belongs to the subset (A1) of stop characters having a backslash condition (i.e., having a backslash in the character);

Specifically, the device obtains the subset (A1) of stop characters with a backslash condition, and then determines whether the current character matches with any stop characters in the subset (A1) of stop characters with a backslash condition. If there is a match, the device ends the process; otherwise, the device proceeds to Step S124.

Step S1283, the device determines whether the current character is a backslash "\"; if yes, then the device proceeds to Step S1284, otherwise, the device proceeds to Step S1285;

Specifically, in order to avoid misjudgment in a scenario in which "\" serves as the first character of the regular expression, when the "is BackSlant" attribute value is determined to be "FALSE", the device shall determine whether the current character is a backslash "\".

Step S1284, the device adds 1 to the current index value, and sets the attribute value "is BackSlant" as "TRUE", and then returns to Step S122;

When the current character c is determined to be a backslash "\", the device sets the "is BackSlant" attribute value to "TRUE", adds 1 to the current index value, and then returns to Step S122.

Step S1285, the device determines whether the current character c belongs to the subset (A2) of stop characters without a backslash condition.

Specifically, the device obtains the subset (A2) of stop characters without a backslash condition, and then determines whether the current character matches with any character in the subset (A2) of stop characters without a backslash condition. If there is a match, the device ends the process; otherwise, the device proceeds to Step S124.

Specifically, in some embodiments, determining whether the character belongs to a stop character set for the predetermined data type further includes: determining whether the character has an associated backslash; in accordance with a determination that the character has an associated backslash, determining whether the character belongs to the subset of stop characters having a backslash condition; and in accordance with a determination that the character does not have any associated backslash, determining whether the character belongs to the subset of stop characters without any backslash condition.

Figure 5:
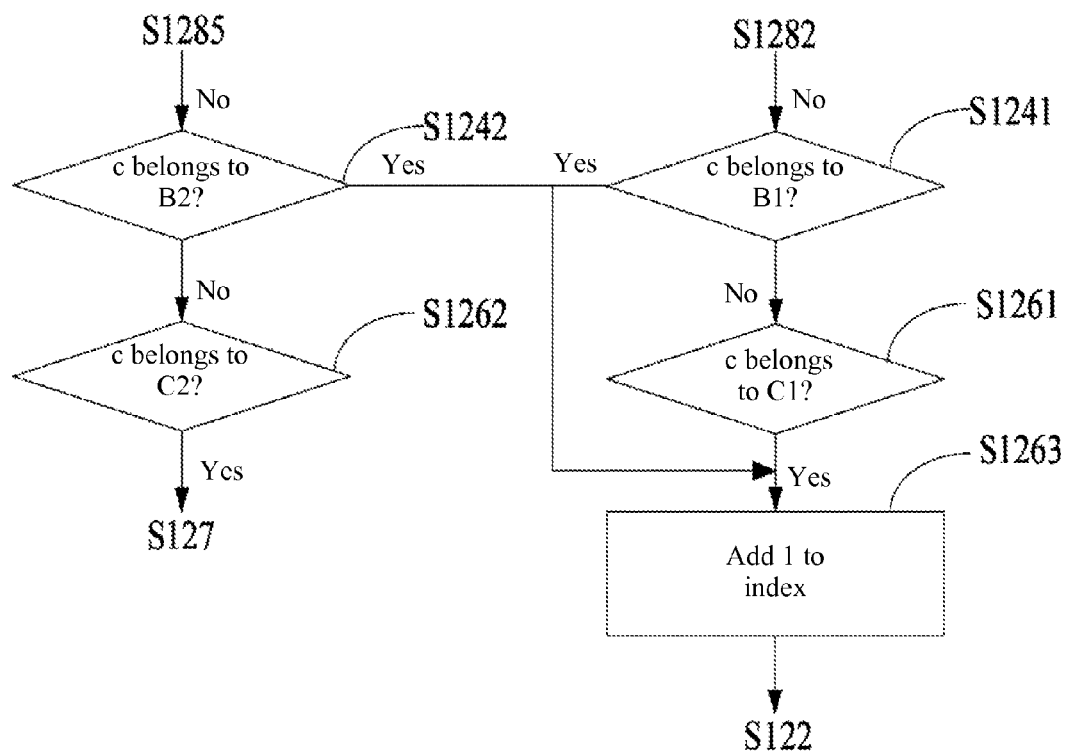
FIG. 5 is the schematic flowchart diagram of an information input control method for input boxes in accordance with some embodiments.

Furthermore, in some embodiments, as shown in FIG. 5, the method of controlling information input for input boxes further includes the following sub-steps. As some characters for the predetermined data type includes characters each having a respective backslash character. Thus, in order to ease the processing for the characters, in some embodiments, the subset (B) of regular validation filter characters and the subset (C) of special validation filter characters may also include characters each having an associated backslash condition. In some embodiments, the subset (B) of regular validation filter characters includes a subset (B1) of regular validation filter character with a backslash condition, and a subset (B2) of regular validation filter characters without a backslash condition. In some embodiments, the subset (C) of special validation filter characters include a subset (C1) of special validation filter characters with a backslash condition and a subset (C2) of special validation filter characters without a backslash condition.

In some embodiments, the process further include the following steps:

Step S1241, when the device has determined that the current character c does not belong to the subset (A1) of stop characters each having a backslash, the device also determines whether the current character c belongs to the subset (B1) of regular validation filter characters with a backslash; if yes, the device proceeds to Step S1263, or otherwise, the device proceeds to Step S1261;

Step S1242, when the device has determined that the current character c does not belong to the subset (A2) of stop characters without a backslash, the device also determines whether the current character c belongs to the subset (B2) of regular validation filter characters without a backslash; if yes, the device proceeds to Step S1263, otherwise, the device proceeds to Step S1262;

Step S1261, the device determines whether the current character c belongs to the subset (C1) of special validation filter characters having a backslash; if yes, the device proceeds to Step S1263, otherwise, the device ends the process;

Step S1262, the device determines whether the current character c belongs to the subset (C2) of special validation filter characters without a backslash; if yes, the device proceeds to Step S127, otherwise, the device ends the process;

Step S1263, the device adds 1 to the current index value, and proceeds to S122.

It can be understood that, in some embodiments, when determining whether the data type of the input box is of the number type only by user filter characters, it is possible to, after extracting each character of the regular expression one by one, determine whether a backslash exists in the current character by reading the value of the backslash attribute. If backslash exists in the current character, then the current character c is matched against the characters in subsets A1 and C1; if backslash does not exist in the current character, then the current character c is matched against the characters in A2 and C2. Details of the matching process are disclosed in more details above.

Figure 6A:
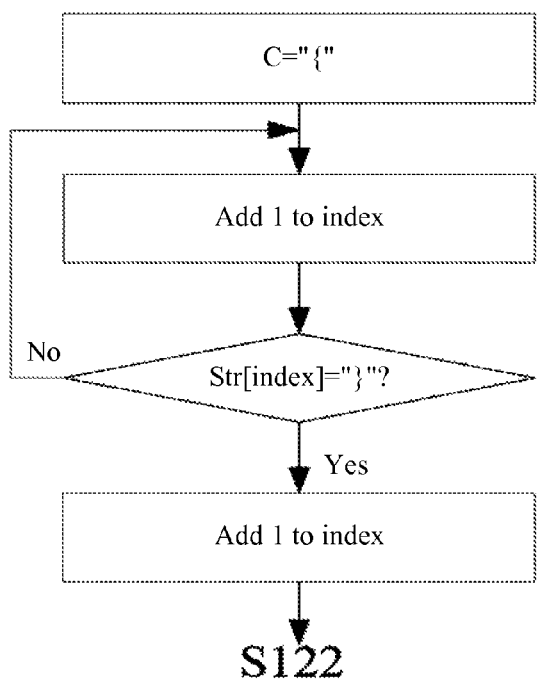
FIG. 6a is the schematic flowchart diagram of processing a character when the character falls between "{ }", in an information input control method for input boxes in accordance with some embodiments.
Figure 6B:
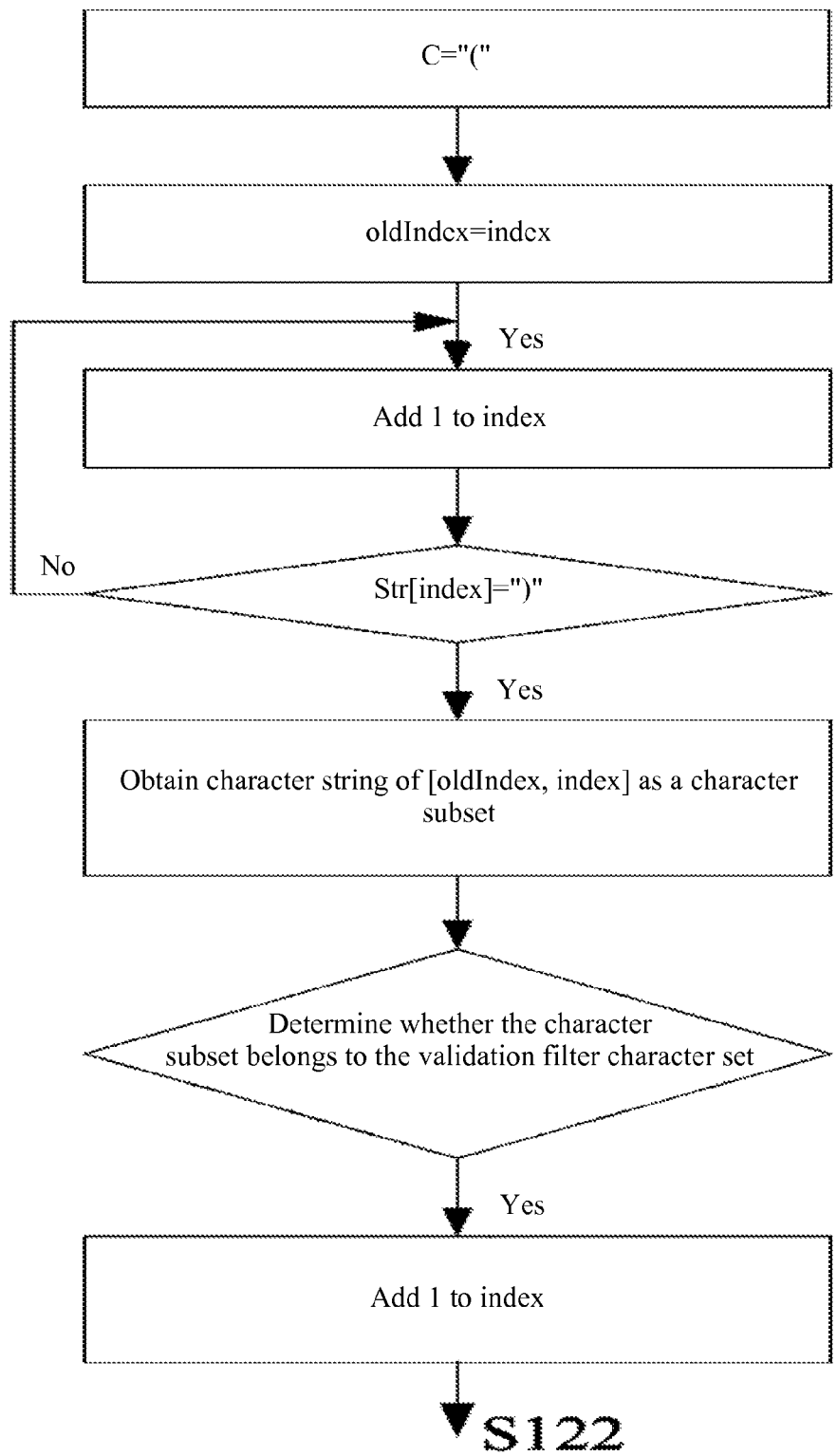
FIG. 6b is the schematic flowchart diagram of processing a character when the character falls between "( )", in an information input control method for input boxes in accordance with some embodiments.
Figure 6C:
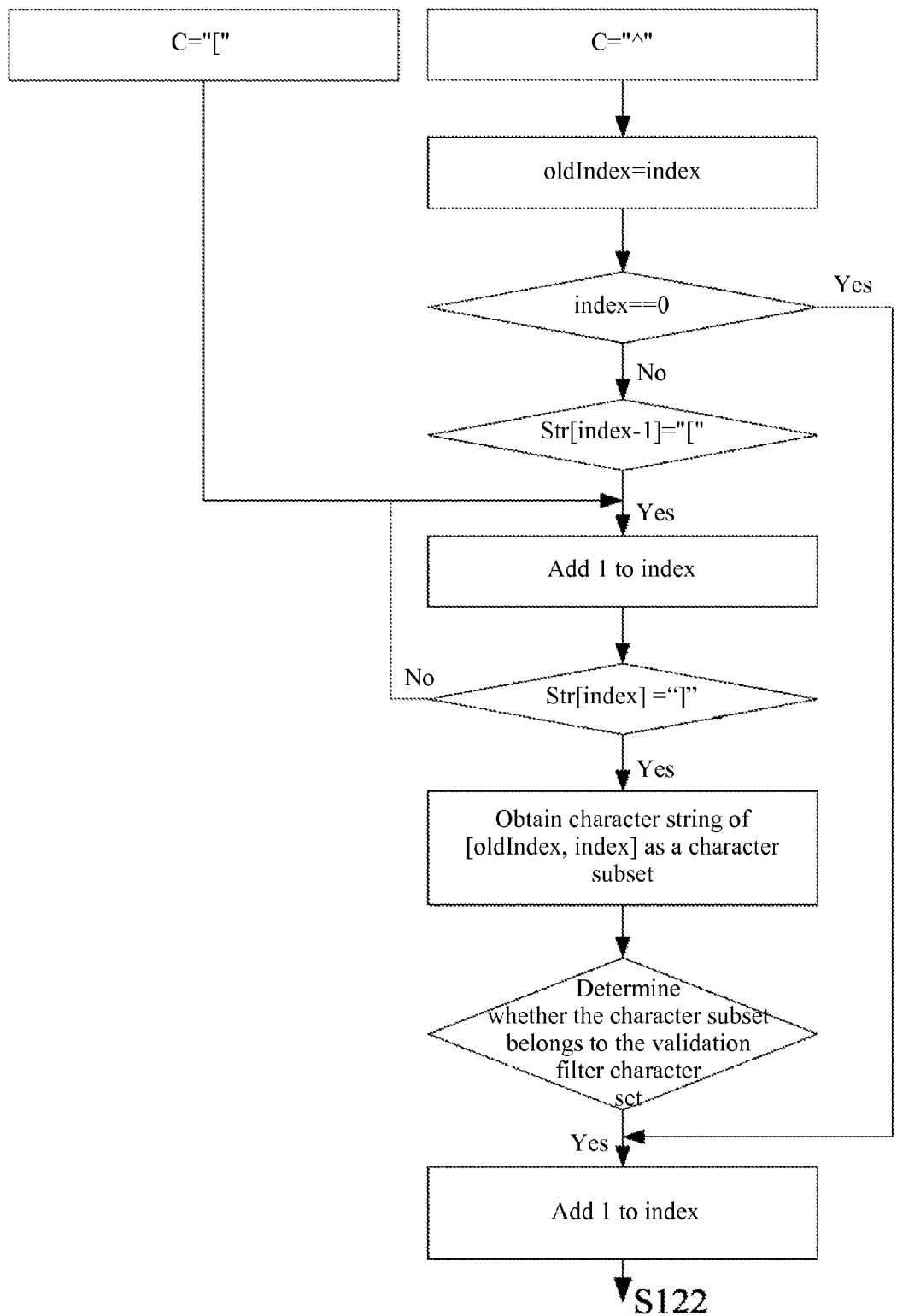
FIG. 6c is the schematic flowchart diagram of processing a character when the character follows """ or falls between "[ ]", in an information input control method for input boxes in accordance with some embodiments.

In some embodiments, as shown in FIG. 6a, FIG. 6b and FIG. 6c, the method for controlling information input for input boxes further includes the following sub-steps. These sub-steps involve mainly the special processing of a character c belonging to the subset (C2) of special validation filter characters without a backslash condition. In some embodiments, C2 includes {^, [ ], { }, ( )}. The following will give an explanation of special processing of the character c when c belongs to C2.

As shown in FIG. 6a, the current character c is "{". As all characters included in "{ }" as well as "{" and "}" are filtered, when c is determined to be "{", the device adds 1 to the current index value, and determines whether the next character is "}", if it is, then the device ends this special processing, and, after adding 1 to the current index value, the device returns to Step S122. If it is not, then the device adds 1 to the current index value, and returns to determine whether the next character is "}".

As shown in FIG. 6b, the current character c is "(". As all characters included in "( )" need recursive processing, when c is determined to be "(", the device first defines a new variable "oldIndex" for saving the current index value; then adds 1 to the index current index value, and determines whether the character corresponding to the current index value is ")", if yes, the device obtains all characters included within [oldIndex, index] are obtained as a character subset, otherwise, the device adds 1 to the index value and determine again whether the character corresponding to the current index value is ")", and so on. In the end, the device re-determines whether each of the characters in the character subset belongs to the validation filter character set of the predetermined data type; if yes, then the device ends the special processing, adds 1 to index, and, after which, returns to Step S122. If any one of characters in the character subset does not belong to the validation filter character set of the predetermined data type, then the device ends the entire process.

As shown in FIG. 6c, if the current character c is "^". As "^" will be filtered when serving as the first character of the regular expression, if the current character c is determined to be "^", the device first defines a new variable "oldIndex" for saving the current index value; then the device determines whether the current index value is 0; if yes, the device adds 1 to the current index value, and, after which, returns to Step S122, otherwise, the device determines whether the character before the current character c is "[". When the character before the current character c is determined to be "[", the device obtains all characters between "[" and "]" as the character subset. Then the device re-determines whether each of the characters in the character subset belongs to the validation filter character set of the predetermined data type; if yes, then the device ends the special processing, adds 1 to the current index value, and, after which, returns to Step S122; if any one of the characters in the character subset does not belong to the validation filter character set of the predetermined data type, then the device ends the entire process.

If the current character c is "[", the device obtains characters between "[" and "]" as the character subset. Then the device re-determines whether each of the characters in the character subset belongs to the validation filter character set of the predetermined data type; if yes, then the device ends the special processing, adds 1 to the current index value, and, after which, returns to Step S122; if any one of the characters in the character subset does not belong to the validation filter character set of the predetermined data type, then the device ends the entire process.

In aforementioned embodiments, the numbers type is used as an example data type of the input box. Naturally, input boxes having other data types are possible. The specific determination rules and the validation filter character set for the different data types may be different. For example, in some embodiments, when making the determination for the Chinese character data type, the set of stop characters A is {.,/,\D,\w,\W,\cx,\f,\n,\r,\s,\t,\v, letters,\xn,\b, \d,\B,\num}, the subset (B) of regular validation filter characters is {*,+,$,|}, and the subset (C) of special validation filter characters is {^,[ ], { },( ),\nm,\u}. In another example, in some embodiments, when making the determination for the English letters data types, the set of stop characters A is {.,/,\D,\w,\W,\cx,\f,\n,\r,\s,\t,\v, Chinese,\xn,\b,\d,\B,\num}, the subset (B) of regular validation filter characters is {*,+,$,|,A-Z,a-z}, and the subset (C) of special validation filter characters is {^,[ ],{ },( ),\nm}.

Figure 7:
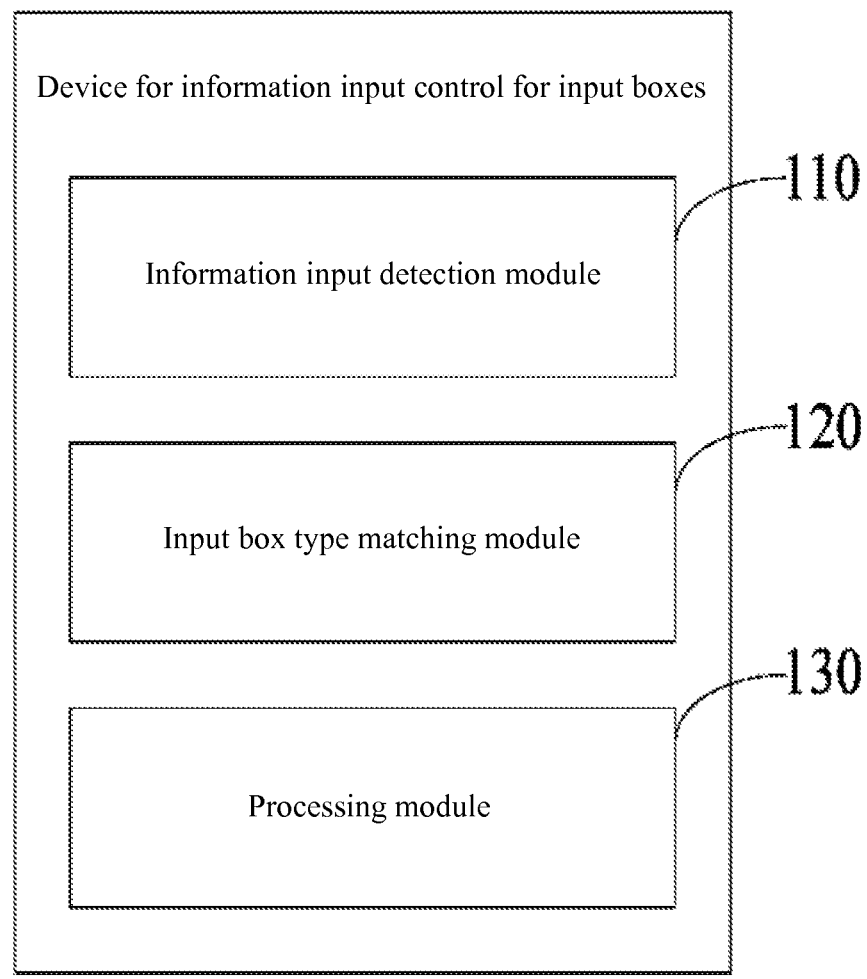
FIG. 7 is the function module schematic diagram of an information input control apparatus for input boxes in accordance with some embodiments.

FIG. 7 shows an example device for controlling information input for input boxes in accordance with some embodiments. The example device performs the methods described above with respect to FIGS. 1-6c. In some embodiments, the device includes:

Information input detection module 110, configured to obtain the regular expression corresponding to the currently selected input box, when the input triggering command of the input box is detected;

Input box type matching module 120, configured to extract each character of the regular expression one by one, and determine whether each character belongs to the validation filter character set of the predetermined data type;

Processing module 130, configured to selectively present the soft keyboard corresponding to the predetermined data type for the user to input information, when all characters belong to the validation filter character set of the predetermined data type.

Furthermore, the mentioned validation filter character set includes a subset of regular validation filter characters and a subset of special validation filter characters; and the mentioned input box type matching module 120 is used to:

Extract each character of the regular expression one by one as the current character, and determine whether the current character belongs to the subset of regular validation filter characters or the subset of special validation filter characters;

When the current character belongs to the subset of regular validation filter characters, then take the next character as the current character;

When the current character belongs to the subset of special validation filter characters, then, obtain the characters between the current character and its matching character as the character subset, and process the character subset accordingly.

Furthermore, the mentioned input box type matching module 120 can also be used to:

Determine whether the current character belongs to a set of stop character for the predetermined data type;

When the current character does not belong to the set of stop characters for the data type, then, determine whether the current character belongs to the subset of regular validation filter characters or the subset of special validation filter characters.

Furthermore, the set of stop characters include a subset of stop characters with a backslash condition and a subset of stop characters without a backslash condition. The mentioned input box type matching module 120 can also be used to:

Determine whether a backslash exists in the current character based on the backslash attribute of the character;

If a backslash is determined to exist in the current character, then determine whether the current character belongs to the subset of stop characters with a backslash condition;

If no backslash is determined to exist in the current character, then determine whether the current character belongs to the subset of stop characters without a backslash condition.

Furthermore, the mentioned validation filter character set includes a subset of validation filter characters with a backslash condition and a subset of validation filter characters without a backslash condition. The mentioned input box type matching module 120 can also be used to:

If a backslash is determined to exist in the current character, then determine whether the current character belongs to the subset of validation filter characters with a backslash condition;

If no backslash is determined to exist in the current character, then determine whether the current character belongs to the subset of validation filter characters without a backslash condition.

Furthermore, the mentioned processing module can also be used to: when the current character does not belong to the validation filter character set of the predetermined data type, then obtain the preset filtering character validation set of the next data type; when each character of regular expression belongs to the preset filtering character validation set of the next data type by judgment, then pop up the soft keyboard corresponding to this next data type for user to input information;

The mentioned input box type matching module is also configured to extract each character of the regular expression one by one, and determine whether each character belongs to the validation filter character set of the predetermined data type.

Refer to the previous method embodiments for working principle and its realized functions of each functional module in the aforementioned control device, and redundant description will be omitted herein.

Figure 8:
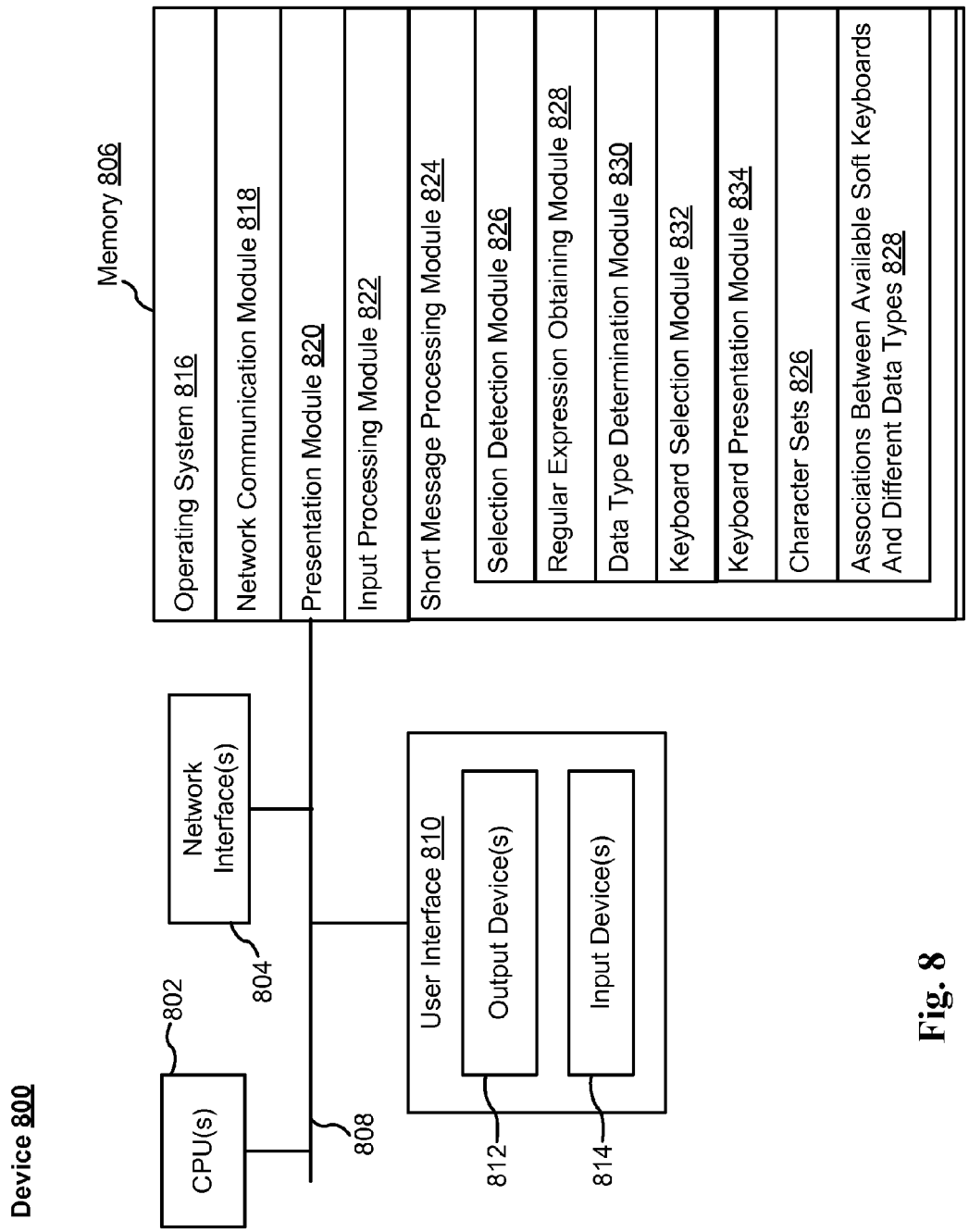
FIG. 8 is a block diagram of a device for controlling information input for input boxes in accordance with some embodiments.

FIG. 8 is a block diagram of a device 800 for performing the methods of controlling information input for input boxes described above in accordance with some embodiments. In some embodiments, the device is a terminal device (e.g., a mobile telephone, a tablet device, a portable computer) that displays one or more input boxes in a graphical user interface, and corresponding soft keyboards on the display screen. The user may select keys on the soft keyboard by a touch input, or a cursor or voice-based selection input directed to the respective keys.

In some embodiments, device 800, typically, includes one or more processing units (CPUs) 802, one or more network interfaces 804, memory 806, and one or more communication buses 808 for interconnecting these components (sometimes called a chipset). Client device 800 also includes a user interface 810. User interface 810 includes one or more output devices 812 that enable presentation of media content. User interface 810 also includes one or more input devices 814, including user interface components that facilitate user input such as a keyboard, keypad, a mouse, a voice-command input unit or microphone, a touch screen display, a touch-sensitive input pad, a gesture capturing camera, or other input buttons or controls. Furthermore, some client devices 800 use a microphone and voice recognition or a camera and gesture recognition to supplement or replace the keyboard. Memory 806 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 806, optionally, includes one or more storage devices remotely located from CPU(s) 802. Memory 806, or alternately the non-volatile memory device(s) within memory 806, includes a non-transitory computer readable storage medium. In some implementations, memory 806, or the non-transitory computer readable storage medium of memory 806, stores the following programs, modules, and data structures, or a subset or superset thereof: an operating system 816 including procedures for handling various basic system services and for performing hardware dependent tasks; a network communication module 818 for connecting user device 800 to other computers (e.g., a message server system or a terminal device) connected to one or more networks via one or more communication network interfaces 804 (wired or wireless); a presentation module 820 for enabling presentation of information (e.g., a user interface for a web page or an application program, audio and/or video content, text, etc.) at device 800 via one or more output devices 812 (e.g., displays, speakers, etc.) associated with user interface 810; an input processing module 822 for detecting one or more user inputs or interactions from one of the one or more input devices 814 and interpreting the detected input or interaction; and an information input control module 824 for providing information input control for input boxes in accordance with the embodiments described herein. In some embodiments, the information input control module 824 includes selection detection module 826, regular expression obtaining module 828, data type determination module 830, keyboard selection module 832, and keyboard presentation module 834. In some embodiments, the information input control module 824 also includes character sets 836 for respective stop characters, special and regular validation filter characters, characters with or without backslash conditions, for each data type, and respective associations 828 between available soft keyboards and different data types.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 406, optionally, stores a subset of the modules and data structures identified above. Furthermore, memory 406, optionally, stores additional modules and data structures not described above.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of input control for text input boxes, comprising:
at a device having one or more processors, memory, and a display:
detecting selection of a text input box in a user interface;
in response to detecting the selection of the text input box and prior to receiving input text for the text input box, obtaining a regular expression for acceptable input corresponding to text input box;
for each character in the regular expression, determining whether the character belongs to a respective validation filter character set for a predetermined data type;
in response to a determination that all characters in the regular expression belongs to the respective validation filter character set for the predetermined data type, selectively presenting a respective character keyboard corresponding to the predetermined data type to a user for text entry, wherein:
the respective validation filter character set includes a subset of regular validation filter characters and a subset of special validation filter characters; and
for each character in the regular expression, determining whether the character belongs to the respective validation filter character set for the predetermined data type further comprises:
determining whether the character belongs to the subset of regular validation filter characters or the subset of special validation filter characters;
in accordance with a determination that the character belongs to the subset of regular validation filter characters, proceeding to process a next character in the regular expression; and
in accordance with a determination that the character belongs to the subset of special validation filter characters, processing all characters that fall between the character and a counterpart character of the character in the regular expression as a respective character subset; and
in response to a determination that a current character in the regular expression does not belong to the respective validation filter character set for the predetermined data type, determining whether each character in the regular expression belongs to a respective validation filter character set for another predetermined data type.

2. The method of claim 1, further comprising:
for each character in the regular expression:
when determining whether the character belongs to the subset of regular validation filter characters or the subset of special validation filter characters, first determining whether the character belongs to a stop character set for the predetermined data type; and
in accordance with a determination that the character does not belong to the stop character set for the predetermined data type, proceeding to determine whether the character belongs to the subset of regular validation filter characters or the subset of special validation filter characters.

3. The method of claim 2, wherein:
the stop character set includes a subset of stop characters having a backslash condition, and a subset of stop characters without any backslash condition; and determining whether the character belongs to a stop character set for the predetermined data type further comprises:
  determining whether the character has an associated backslash;
  in accordance with a determination that the character has an associated backslash, determining whether the character belongs to the subset of stop characters having a backslash condition; and
  in accordance with a determination that the character does not have any associated backslash, determining whether the character belongs to the subset of stop characters without any backslash condition.

4. A system for input control for text input boxes, comprising:
  one or more processors; and
  memory having instructions stored thereon, the instructions, when executed by the one or more processors, cause the processors to perform operations comprising:
    detecting selection of a text input box in a user interface;
    in response to detecting the selection of the text input box and prior to receiving input text for the text input box, obtaining a regular expression for acceptable input corresponding to text input box;
    for each character in the regular expression, determining whether the character belongs to a respective validation filter character set for a predetermined data type;
    in response to a determination that all characters in the regular expression belongs to the respective validation filter character set for the predetermined data type, selectively presenting a respective character keyboard corresponding to the predetermined data type to a user for text entry, wherein:
      the respective validation filter character set includes a subset of regular validation filter characters and a subset of special validation filter characters; and
    for each character in the regular expression, determining whether the character belongs to the respective validation filter character set for the predetermined data type further comprises:
      determining whether the character belongs to the subset of regular validation filter characters or the subset of special validation filter characters;
      in accordance with a determination that the character belongs to the subset of regular validation filter characters, proceeding to process a next character in the regular expression; and
      in accordance with a determination that the character belongs to the subset of special validation filter characters, processing all characters that fall between the character and a counterpart character of the character in the regular expression as a respective character subset; and
    in response to a determination that a current character in the regular expression does not belong to the respective validation filter character set for the predetermined data type, determining whether each character in the regular expression belongs to a respective validation filter character set for another predetermined data type.

5. The system of claim 4, wherein the operations further comprise:
  for each character in the regular expression:
    when determining whether the character belongs to the subset of regular validation filter characters or the subset of special validation filter characters, first determining whether the character belongs to a stop character set for the predetermined data type; and
    in accordance with a determination that the character does not belong to the stop character set for the predetermined data type, proceeding to determine whether the character belongs to the subset of regular validation filter characters or the subset of special validation filter characters.

6. The system of claim 5, wherein:
  the stop character set includes a subset of stop characters having a backslash condition, and a subset of stop characters without any backslash condition; and
  determining whether the character belongs to a stop character set for the predetermined data type further comprises:
    determining whether the character has an associated backslash;
    in accordance with a determination that the character has an associated backslash, determining whether the character belongs to the subset of stop characters having a backslash condition; and
    in accordance with a determination that the character does not have any associated backslash, determining whether the character belongs to the subset of stop characters without any backslash condition.

7. A non-transitory computer-readable medium having instructions stored thereon, the instructions, when executed by one or more processors, cause the processors to perform operations comprising:
  detecting selection of a text input box in a user interface;
  in response to detecting the selection of the text input box and prior to receiving input text for the text input box, obtaining a regular expression for acceptable input corresponding to text input box;
  for each character in the regular expression, determining whether the character belongs to a respective validation filter character set for a predetermined data type; and
  in response to a determination that all characters in the regular expression belongs to the respective validation filter character set for the predetermined data type, selectively presenting a respective character keyboard corresponding to the predetermined data type to a user for text entry, wherein:
    the respective validation filter character set includes a subset of regular validation filter characters and a subset of special validation filter characters; and
  for each character in the regular expression, determining whether the character belongs to the respective validation filter character set for the predetermined data type further comprises:
    determining whether the character belongs to the subset of regular validation filter characters or the subset of special validation filter characters;
    in accordance with a determination that the character belongs to the subset of regular validation filter characters, proceeding to process a next character in the regular expression; and
    in accordance with a determination that the character belongs to the subset of special validation filter characters, processing all characters that fall between the character and a counterpart character of the character in the regular expression as a respective character subset; and
  in response to a determination that a current character in the regular expression does not belong to the respective validation filter character set for the predetermined data type, determining whether each character in the regular expression belongs to a respective validation filter character set for another predetermined data type.

8. The computer-readable medium of claim 7, wherein the operations further comprise:
for each character in the regular expression:
when determining whether the character belongs to the subset of regular validation filter characters or the subset of special validation filter characters, first determining whether the character belongs to a stop character set for the predetermined data type; and
in accordance with a determination that the character does not belong to the stop character set for the predetermined data type, proceeding to determine whether the character belongs to the subset of regular validation filter characters or the subset of special validation filter characters.

9. The computer-readable medium of claim 8, wherein:
the stop character set includes a subset of stop characters having a backslash condition, and a subset of stop characters without any backslash condition; and
determining whether the character belongs to a stop character set for the predetermined data type further comprises:
determining whether the character has an associated backslash;
in accordance with a determination that the character has an associated backslash, determining whether the character belongs to the subset of stop characters having a backslash condition; and
in accordance with a determination that the character does not have any associated backslash, determining whether the character belongs to the subset of stop characters without any backslash condition.

* * * * *